Feb. 22, 1955 B. NAGLER 2,702,601
JET DRIVEN HELICOPTER ROTOR SYSTEM
Filed April 26, 1952 2 Sheets-Sheet 1
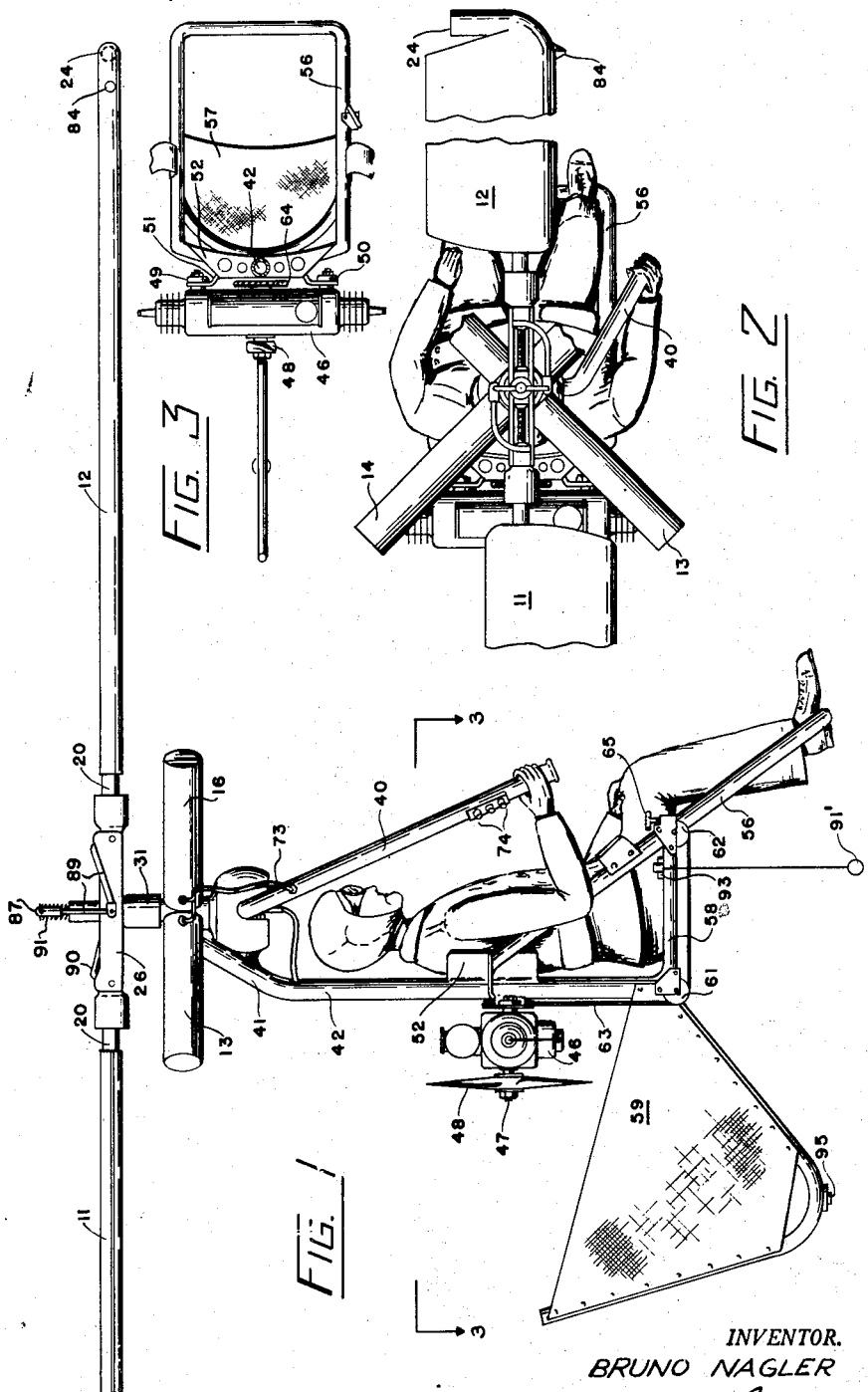
INVENTOR.
BRUNO NAGLER
BY Martin J. Finnegan
ATTORNEY

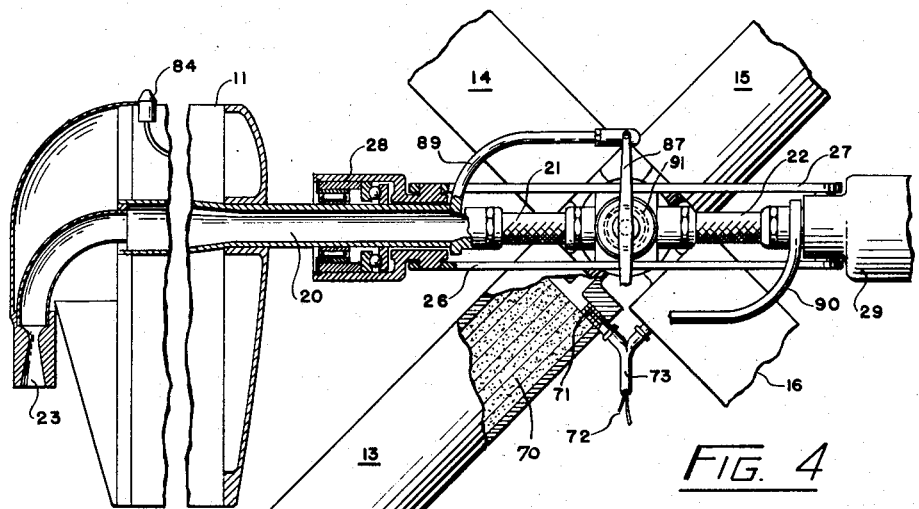
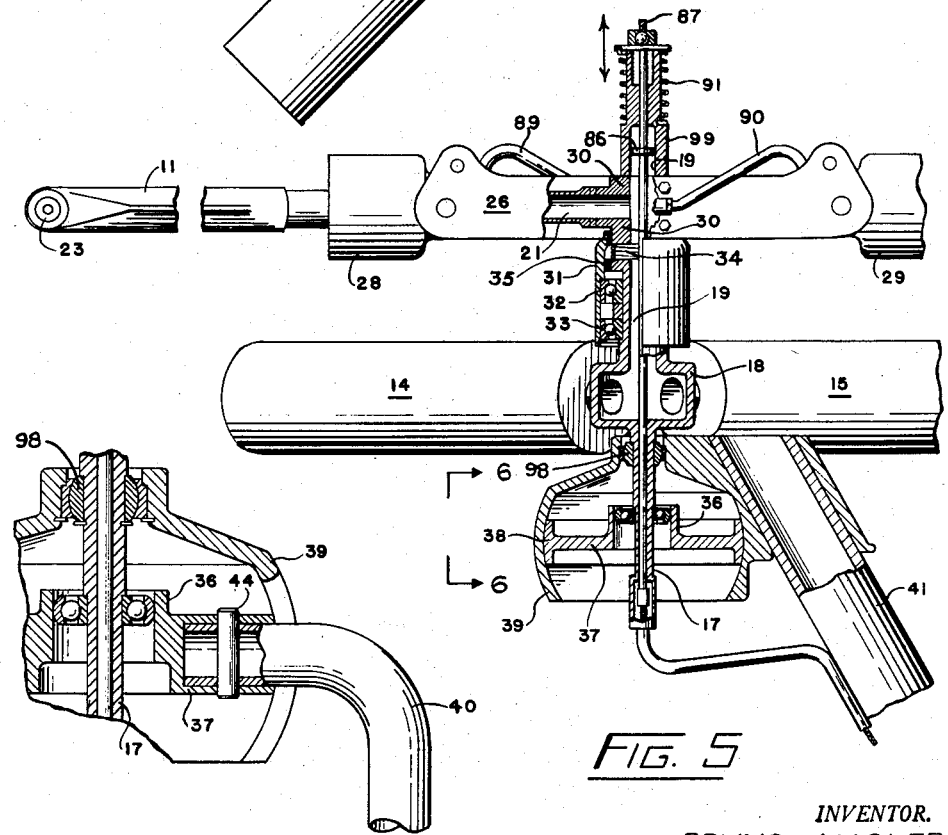
FIG. 4
FIG. 5
FIG. 6
INVENTOR.
BRUNO NAGLER
BY Martin J. Finnegan
ATTORNEY

United States Patent Office

2,702,601
Patented Feb. 22, 1955

2,702,601

JET DRIVEN HELICOPTER ROTOR SYSTEM

Bruno Nagler, Boston, Mass., assignor to Nagler Helicopter Company, Inc., a corporation of Delaware Application April 26, 1952, Serial No. 284,580

1 Claim. (Cl. 170—135.4)

This invention relates to aeronautics, and particularly to methods and means whereby a person may cause himself to ascend to any desired height and subsequently return to the earth's surface, at a gliding angle, with or without an intervening period or periods of horizontal cruising at the level of original ascent, or at lower levels on the descending glide path.

In my patent application No. 252,647 filed October 23, 1951, I have disclosed and claimed a craft having rotatable wings ("blades") of direct vertical flight and subsequent return to earth along an oblique glide path; the rotation of the wings being brought about by the discharge of fluid under pressure from the wing tips, and the pressure fluid being generated in power plants of the rocket type, mounted on the respective wings. The present invention relates to the same general character of craft, except that the power plant is centrally disposed on the non-rotating wing-supporting frame, and the generated pressure fluid is delivered to all the wings, simultaneousely, by way of a common manifold chamber, in response to the firing of a single rocket unit, constituting one of the group of rocket units comprising said fixedly-mounted power plant.

It is an object of the invention, therefore, to provide a novel method of transportation through air, which comprises the steps of (1) igniting a single charge of solid combustible material at a point spaced from the rotating wing assembly, and (2) delivering simultaneously to all of the individual wings of the assembly the pressure fluid generated from said single combustible charge, by means of a manifold conduit connection common to all of said wings.

A second object of the invention is to provide an aircraft having rotary wings, a supporting manifold on which said wings are rotatably journaled, and a plurality of pressure fluid generating rocket motors secured to said supporting manifold in angularly spaced positions about the periphery of said manifold; the said manifold serving as the conduit for delivery to the rotary wings of the pressure fluid generated by each of said rocket motors, in sequence.

A third object of the invention is to provide, in a manifold conduit of the character indicated, complementary sections which are respectively rotatable and non-rotatable; there being novel means associated therewith for maintaining a fluid-tight seal at the line of joinder of said complementary sections.

These and other objects of the invention will be understood upon reference to the following description of the embodiment of the invention illustrated in the accompanying drawings, wherein:

Fig. 1 is an elevation view of the invention as embodied in a flying machine having rotary wings journaled in a supporting rig adapted for suspension about the body of a person to be flown therein; the rig also carrying a power plant equipped with a vertically rotating propeller;

Fig. 2 is a plan view of the machine of Fig. 1;

Fig. 3 is a horizontal sectional view on line 3—3 of Fig. 1;

Fig. 4 is a fragmentary plan view, on a scale larger than that of Fig. 2;

Fig. 5 is a vertical sectional view of the upper portion of the supporting ring, including the spherical socket bearing, vertical spindle, wing-tilting and electrical current-directing mechanisms above referred to;

Fig. 6 is a vertical sectional view along line 6—6 of Fig. 5.

Referring first to Figs. 1, 4 and 5, there is illustrated therein a pair of hollow blades, or wings, 11, 12 of aerofoil cross-section, and a series of fluid pressure generating units (rocket motors) 13–16; the units 13 to 16 being integrated with the vertical spindle 17 at the enlarged central portion 18 which constitutes the single manifold chamber for all of the rocket motors. Each of these rocket units is adapted to be ignited individually, by electrical means; and each is adapted to discharge its liberated gases into the manifold 18 which in turn directs the gases into the vertical passage 19 connecting with the horizontally disposed flexible tubes 21, 22 feeding the tubes 20 extending through each blade, and terminating in the discharge jets 23, 24 at the tips of the respective blades.

The tubes 20 of the blades 11, 12 are rotatably supported in the bearing assemblies 28 and 29, the latter being in turn hinged to the parallel yoke members 26, 27 forming part of the hub 30 whose skirt 31 is rotatably mounted on the ball-bearing assemblies 32, 33 surrounding the upper portion of spindle 17. The lower portion of spindle 17 is received in the ball-bearing hub 36 of an irreversible steering assembly including a ring 37 having a spherical-surfaced rim 38 fitting a socket bearing 39, which latter is mounted at the upper curved end 41 of vertical column 42, said column 42 being the main element of the suspension rig. The bearing 39 is slotted to receive the end of steering rod 40, the latter connecting with ring 37, as by transverse pin 44.

The power plant 46, whose shaft 47 carries the propeller 48, is fitted with two brackets 49 and 50, adapted to receive the cross-bar 51 welded to saddle 52 of the suspension rig, the saddle being apertured to receive the column 42 at the point adjacent to the point of attachment of cross-bar 51.

Also secured to saddle 52 (in such manner as to permit folding of the parts when not in use) are the ends of a U-shaped tube 56 adapted to serve as a leg rest for use by the pilot of the rig. A seat 57 is attached to a horizontally disposed curved element 58, into which the lower end of the vertical column 42 is fitted. A stabilizer panel 59 is attached to the column 42, to extend rearwardly, as shown; the rig being generally similar to that of my copending application, above identified. Body-retaining straps may, of course, be attached wherever desired. Pulleys 61, 62 guide a cable 63 that is wound about sheave 64 on the engine shaft 47. The pilot grasps handle 65, on the end of this cable, and exerts a sharp pull thereon for the purpose of starting the engine; the cable being spring-retracted, in the usual manner.

Fig. 4 illustrates in some detail the interior structure of one of the rocket motors. As shown therein, these motors are in angularly disposed relationship about the vertical axis of the craft, each motor containing a "stick" of solid propellant 70 adapted to be ignited along its forward face, when electric current is delivered to igniter electrode 71, by means of lead wire 72, which is one of a group of wires carried in sheath 73; said wires leading to the appropriate terminals of switch assembly 74.

Additional rocket units (not shown), preferably may be provided to operate as "cushion"-creating agencies, just prior to contact with the ground, on the gliding descent, in the manner explained more fully in my copending application, above identified.

The conductors in sheath 73 lead to their respective rocket units 13 to 16, except that two of the conductors lead to the rocket units 84 on the respective blade tips; ignition of the latter rocket units being controlled by the automatic switch 95 which closes upon contact between stabilizer 59 and the ground, as the craft descends. The firing of these two blade-tip rockets causes the direction of force application to be reversed, thus bringing rotation of the blades to a prompt halt, once the craft has landed; the circuit connections from switch 95 to the rockets 84, also the connection to one of the rockets from switch 93 (actuated by weight 91') and to the other rockets from switches 74 (actuated manually)—being as illustrated in "Fig. 7" of my co-pending application, above identified.

During the ascent of the rig, the vertical passage 19 carries fluid under pressure into the cylinder 99, to raise the cross-bar 87. Depression of cross-bar 87 turns the tube 20 and hence the rotating blade 11 downwardly (as viewed in Fig. 4) about the axis of tube 20, to vary the blade pitch to an angle that is best suited to vertical ascent, and likewise blade 12 (not shown in Fig. 4) will be correspondingly turned to its best pitch angle for ascent; the links 89 and 90 being involved to produce such turning. Following depletion of the fluid pressure supply, spring 91 will push piston 86 back to its lower position, thereby returning blades 11, 12 to the opposite pitch positions, the latter being best for the gliding descent of the rig. During such descent the rider steers the rig by leaning to the left or right, as desired, and applying corresponding pressure to the steering rod 40 to vary the angle of inclination of the rotating blade assembly; the steering ring 37 being adapted to slide about the inner spherical surface of the bearing element 39 during such steering process. When lateral pressure is exerted by the operator on the lower end of steering rod 40, the ring 37 which is rigidly affixed to steering rod 40 is tilted within the socket bearing 39 which causes the lower end of spindle 17 to be displaced laterally by the ball bearing hub 36 and spindle 17 will pivot about the curved bearing surface 98. This pivoting of spindle 17 in turn causes tilting of the lifting blades 11 and 12 which are mounted upon the upper end of spindle 17. By exerting lateral pressure in the proper direction on steering rod 40, thereby bringing about a proper tilting in the blades 11 and 12, the desired steering effect may be obtained.

What I claim is:

In an aircraft of the rotary wing type, a plurality of blades mounted for rotation in a horizontal plane, a suspension rig in which said blades are journaled, a series of rocket motors mounted upon said rig, solid-fuel rocket charges within said rocket motors, a manifold common to all of said rocket motors, fluid conducting passages connecting said manifold with said blades to supply rotative energy to said blades upon ignition of any of said rocket units, an automatic blade pitch control means responsive to the pressure in said manifold adapted to produce increased blade pitch in the rotating blades during the power output of the rocket motors, and means for igniting and expending said solid-fuel rocket charges in sequence.

References Cited in the file of this patent

UNITED STATES PATENTS

| 1,099,083 | Duc | June 2, 1914 |

FOREIGN PATENTS

| 427,951 | France | June 10, 1911 |
| 1,002,007 | France | Oct. 31, 1951 |
| 631,194 | Great Britain | Oct. 28, 1949 |